United States Patent
Terasaki (10) Patent No.: US 7,118,132 B2
(45) Date of Patent: Oct. 10, 2006

(54) COVER STRUCTURE OF SEAT BELT PRETENSIONER

(75) Inventor: Tsutomu Terasaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 338 days.

(21) Appl. No.: 10/829,487

(22) Filed: Apr. 22, 2004

(65) Prior Publication Data

US 2004/0212188 A1 Oct. 28, 2004

(30) Foreign Application Priority Data

Apr. 22, 2003 (JP) ............................ 2003-117355
Apr. 22, 2003 (JP) ............................ 2003-117380

(51) Int. Cl.
*B60R 22/36* (2006.01)
(52) U.S. Cl. .................................................. 280/806
(58) Field of Classification Search ............... 280/806; 297/480, 482
See application file for complete search history.

(56) References Cited

U.S. PATENT DOCUMENTS 3,811,703 A * 5/1974 Turkovich .................. 297/474
4,258,934 A    3/1981 Tsuge et al.
6,068,664 A * 5/2000 Meyer et al. ............... 297/480
6,149,242 A * 11/2000 Pesta et al. ................. 297/480

FOREIGN PATENT DOCUMENTS

| JP | 49-2027 | 4/1947 |
| JP | 1-158258 | 11/1989 |
| JP | 3-292239 | 12/1991 |
| JP | 8-164821 | 1/1998 |
| JP | 2000-501675 | 2/2000 |
| JP | 2001-225722 | 8/2001 |

* cited by examiner

*Primary Examiner*—Paul N. Dickson
*Assistant Examiner*—Laura B. Rosenberg
(74) *Attorney, Agent, or Firm*—Rankin, Hill, Porter & Clark LLP (57) ABSTRACT

A seat belt pretensioner includes a pretensioner main body disposed at a side of a seat cushion, a moving member connected to an end of a seat belt, a wire for connecting the pretensioner main body with the moving member, and a containing cover for covering the moving member and the wire. The pretensioner main body generates a tension force by reacting with a deceleration of a vehicle exceeding a constant value, the pretensioner main body. The wire transmits the tension force therethrough to the seat belt to pull the seat belt into the pretensioner main body. The containing cover includes a lower portion attached to the pretensioner main body and an upper portion having a through port for allowing the end of seat belt to pass therethrough.

3 Claims, 12 Drawing Sheets

COVER STRUCTURE OF SEAT BELT PRETENSIONER

The present disclosure relates to the subject matters contained in Japanese Patent Application Nos. 2003-117355 and 2003-117380 both filed Apr. 22, 2003, which are incorporated herein by reference in their entirety.

BACKGROUND OF THE INVENTION

1. Field of the Invention

The present invention relates to a cover structure of a seat belt pretensioner configured to connect a seat belt to a pretensioner main body by a connecting member of a wire or the like and cover the connecting member by a containing cover.

2. Background Art

There is known a seat belt pretensioner for constraining a passenger by pulling a seat belt in order to protect the passenger in rapid deceleration of a vehicle or the like. There is a seat belt pretensioner configured to protect a wire connecting a seat belt to a pretensioner main body against dust by covering the wire by a cover in a bellows-like shape (refer to, for example, JP-A-2001-225722 (pages 3 through 4, FIG. 2)).

Meanwhile, there is a seat belt pretensioner which does not use a cover in a bellows-like shape as a cover for protection (refer to, for example, JP-A-8-164821 (pages 4 through 5, FIG. 1)).

A detailed explanation will be given of JP-A-2001-225722, mentioned above, in reference to the following drawings.

Figure 11A:
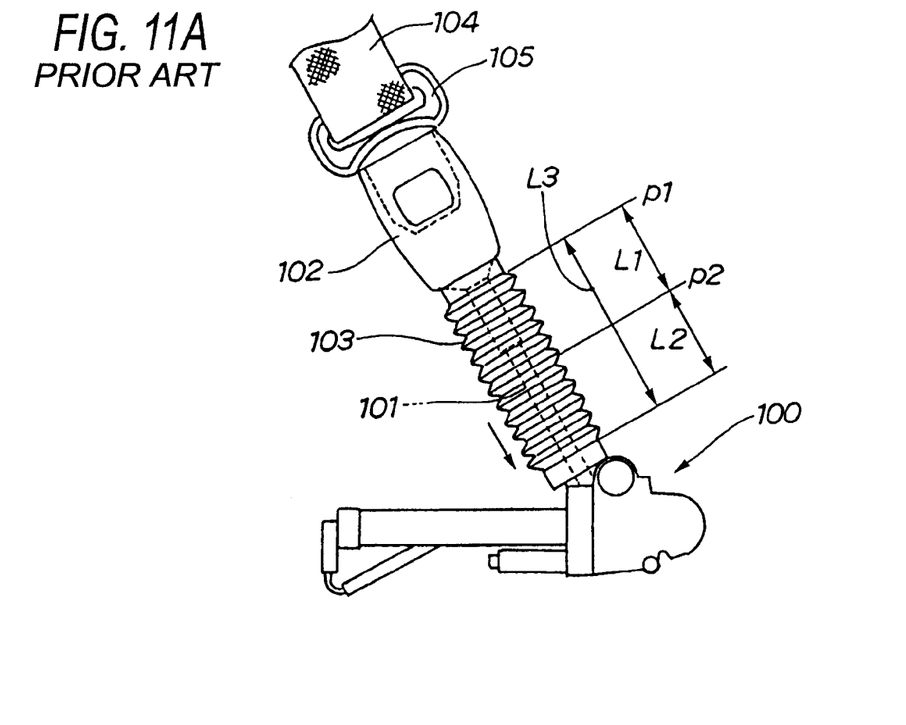
FIGS. 11A and 11B illustrate side views showing a seat belt pretensioner of a related art.
Figure 11B:
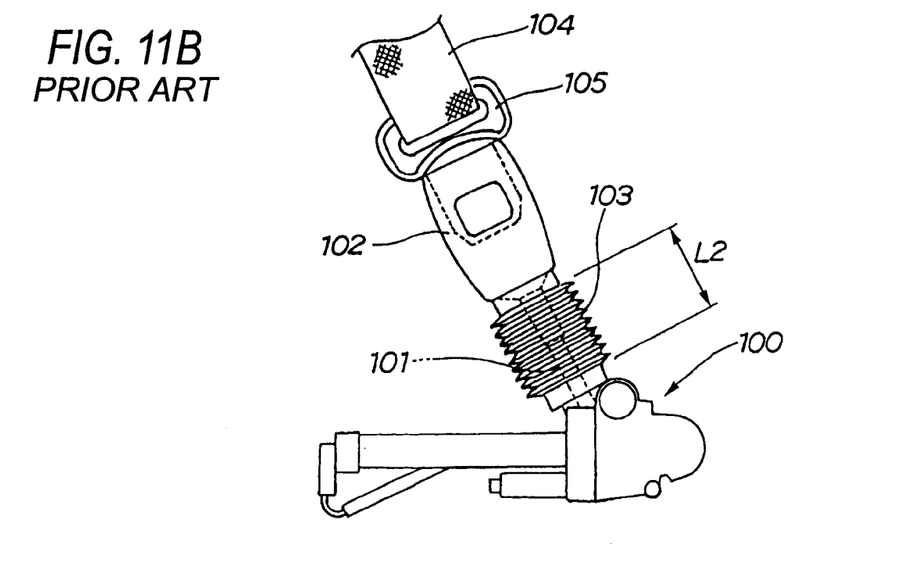

FIGS. 11A and 11B are side views showing a seat belt pretensioner of a related art, FIG. 11A shows a state before crushing a cover in a bellows-like shape, and FIG. 11B shows a state of crushing the cover in the bellows-like shape.

A seat belt pretensioner 100 is arranged at a side of a seat cushion (not illustrated), the seat belt pretensioner 100 is connected with a buckle 102 via a wire 101 and the wire 101 is covered by a cover 103 in a bellows-like shape.

According to the seat belt pretensioner 100, a tension force is generated at the seat belt pretensioner 100 by being made to react with a deceleration degree of a vehicle in a state of connecting a tongue 105 of a seat belt 104 to the buckle 102.

The buckle 102 is moved down by pulling the wire 101 in an arrow mark direction by the tension force of the seat belt pretensioner 100 and the tongue 105 is moved down integrally with the buckle 102.

The passenger is constrained by the seat belt 104 by pulling the seat belt 104 by moving down the tongue 105.

Meanwhile, according to the seat belt pretensioner 100, the cover 103 in the bellows-like shape is crushed as shown by FIG. 11B by moving down the buckle by pulling the wire 101 by a moving amount L1 from a normal portion p1 to a constraining portion p2. A length in crushing the cover 103 in the bellows-like shape, that is, a minimum length is designated by notation L2.

By using the cover 103 in the bellows-like shape in this way, even when the cover 103 is crushed, a length of the cover 103 remains by the amount of L2.

Therefore, a total length L3 of the cover 103 in normal time becomes a length configured by adding the moving amount L1 of the buckle 102 and the minimum length L2 of the cover 103. Thereby, the length of the cover 103 in normal time is prolonged and the buckle 102 and the tongue 105 are arranged at comparatively high positions.

Therefore, there is a concern that the buckle 102 and the tongue 105 are projected to an upper side of the seat cushion. When the buckle 102 and the tongue 105 are projected to the upper side of the seat cushion, the buckle 102 and the tongue 105 touch the passenger in a state in which the passenger is seated on a seat and seat comfort cannot be maintained excellently.

In addition thereto, when the seat belt pretensioner 100 of this type is attached to a side of a center pillar, for example, the seat belt pretensioner 100 is disposed at a vicinity of a reclining operating lever of a seat back.

Therefore, when the buckle 102 and the tongue 105 are projected to the upper side of the seat cushion, the seat belt pretensioner constitutes a hindrance against operation of the reclining operating lever.

Next, a detailed explanation will be given of a seat belt pretensioner of JP-A-8-164821 in reference to FIG. 12.

Figure 12:
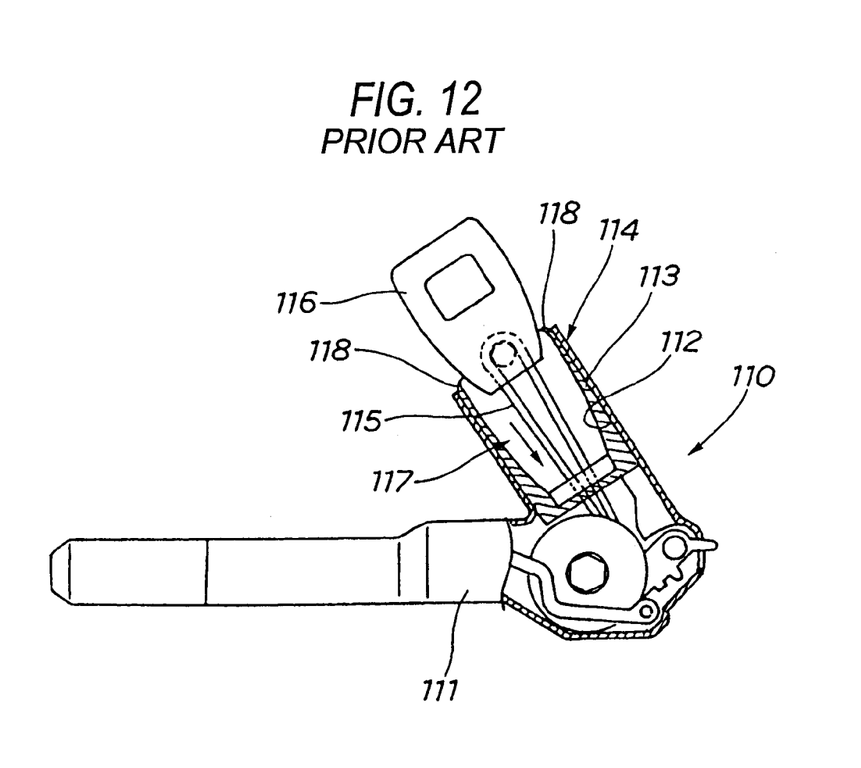
FIG. 12 is a sectional view showing a seat belt pretensioner of a related art.

FIG. 12 is a sectional view showing a seat belt pretensioner of a related art, showing a seat belt pretensioner which does not use a cover in a bellows-like shape.

A seat belt pretensioner 110 is provided with a constituent member of a pretensioner at inside of a casing 111 substantially in a V-like shape and a cover 114 is formed by containing a single cover member 113 in an opening space 112 formed by the casing 111.

The seat belt pretensioner 110 is for pulling a buckle 116 into a containing portion 117 at inside of the single cover member 113 by pulling a wire 115 in an arrow mark direction.

The single cover member 113 is provided with a lip portion 118 at a front end thereof and the containing portion 117 is closed by bringing the lip portion 118 into contact with an outer periphery of the buckle 116 to thereby prevent dust or the like from invading inside of the containing portion 117.

According to the seat belt pretensioner 110, since a cover in a bellows-like shape is not used, a total length of the cover 114 can be shortened by restraining the length of the cover 114 only to an amount of moving the buckle 116.

However, the cover 114 only closes the containing portion 117 by bringing the lip portion 118 of the single cover member 113 into contact with the outer periphery of the buckle 116 and therefore, when a tongue (not illustrated) is inserted into the buckle 116 for constraining a passenger by a seat belt, the buckle 116 is inclined to the cover 114 and the lip portion 118 is separated from the buckle 116.

Whereby, there is a concern that the containing portion 117 is opened and dust or the like invades the containing portion 117.

In addition thereto, the cover 114 of the seat belt pretensioner 110 needs to form the lip portion 118 at the single cover member 113 in order to form the opening space 112 by utilizing a portion of the casing 111, contain the single cover member 113 in the opening space 112 and close the containing portion 117 of the single cover member 113.

Therefore, the constituent members of the cover 114 are increased, which constitutes a hindrance against a reduction in cost.

SUMMARY OF THE INVENTION

Hence, it is an object of the invention to provide a cover structure of a seat belt pretensioner capable of shortening a total length of a cover, preventing dust from invading and capable of reducing a number of parts in order to resolve the above-described drawback.

The invention provides a seat belt pretensioner, including: a pretensioner main body for generating a tension force by reacting with a deceleration of a vehicle exceeding a constant value, the pretensioner main body disposed at a side of a seat cushion; a moving member connected to an end of a seat belt; a wire for connecting the pretensioner main body with the moving member and transmitting the tension force therethrough to the seat belt to pull the seat belt into the pretensioner main body; and a containing cover for covering the moving member and the wire. The containing cover includes a lower portion attached to the pretensioner main body and an upper portion having a through port for allowing the end of seat belt to pass therethrough.

The moving body in the containing cover is moved to the pretensioner main body by pulling the wire by the tension force of the pretensioner main body and pulling the moving member by the wire. By moving the moving member, the seat belt is pulled by the moving member and a passenger is constrained by the seat belt.

In this way, the moving member is covered by the containing cover and the moving member is configured to be movable in the containing cover and therefore, the moving member can be moved without crushing the containing cover.

Here, it is also conceivable to crush the containing cover in pulling the seat belt by moving the moving member. However, when the containing cover is configured to be crushed, it is necessary to determine a total length of the containing cover by adding a cover length in crushing the containing cover other than an amount of moving the moving member. Therefore, when the containing cover is configured to be crushed, it is necessary to ensure the large total length of the containing cover.

Hence, the moving member is made to move without crushing the containing cover. Therefore, the total length of the containing cover can be determined in consideration only of the amount of moving the moving member without taking a consideration in the cover length in crushing the containing cover and the containing cover can be shortened.

The invention provides a seat belt pretensioner including: a pretensioner main body for generating a tension force by reacting with a deceleration of a vehicle exceeding a constant value, the pretensioner main body disposed at a side of a seat cushion; a moving member connected to an end of a seat belt; a wire for connecting the pretensioner main body with the moving member and transmitting the tension force therethrough to the seat belt to pull the seat belt into the pretensioner main body; and a containing cover for covering the moving member and the wire. The containing cover includes a lower portion attached to the pretensioner main body and an upper portion having a through port for allowing the end of seat belt to pass therethrough. The upper portion has a tacking portion in which the seat belt is tacked to the containing cover. Te tacking portion is broken by the tension force when the seat belt is pulled.

The moving member at inside of the containing cover is moved to the pretensioner main body by pulling the wire by the tension force of the pretensioner main body and breaking the tacking of the seat belt by pulling the moving member by the wire. By moving the moving member, the seat belt is pulled by the moving member and a passenger is constrained by the seat belt.

In this way, the moving member is covered by the containing cover and the moving member is configured to be movable at inside of the containing cover and therefore, the moving member can be moved without crushing the containing cover.

Here, it is also conceivable to crush the containing cover in pulling the seat belt by moving the moving member. However, when the containing cover is configured to crush the containing cover, it is necessary to determine the total length of the containing cover by adding a cover length in crushing the containing cover other than an amount of moving the moving member. Therefore, when the containing cover is configured to crush, it is necessary to ensure the large total length of the containing cover.

Hence, the moving member is moved without crushing the containing cover. Therefore, the total length of the containing cover can be determined in consideration of only the amount of moving the moving member without taking a consideration of the cover length in crushing the containing cover and the containing cover can be shortened.

Meanwhile, it is conceivable that, for example, in constraining the passenger by using the seat belt, the seat belt connected to the moving member is deformed in a bent shape by following the body of the passenger to push to widen the through hole by the seat belt.

Hence, the seat belt is tacked to the containing cover at the portion of the through port of the containing cover.

Therefore, for example, in constraining the passenger by using the seat belt, even when the seat belt connected to the moving member is deformed in the bent shape by following the body of the passenger, the through port can be prevented from being pushed to widen by the seat belt.

Further, by covering the moving member and the wire by the containing cover and attaching the lower portion of the containing cover at the pretensioner main body, the constitution of the containing cover can be formed by a single member and a number of constituent parts of the containing cover can be reduced.

Thereby, simplification of the containing cover can be realized and a reduction in cost can be achieved.

Preferably, the tacking portion includes a seaming string for tacking the seat belt.

The seaming string is used for tacking the seat belt to the containing cover. The seat belt can simply be tacked to the containing cover only by the seaming string. In addition thereto, the seat belt can be tacked to the containing cover by using the inexpensive seaming string.

Meanwhile, when the wire is pulled by the tension force of the pretensioner main body, the seaming string can be broken by pulling the moving body by the wire.

Therefore, the seat belt can be pulled by the moving member by moving the moving member in the containing cover to the pretensioner main body.

BRIEF DESCRIPTION OF THE DRAWINGS

The present invention may be more readily described with reference to the accompanying drawings.

DETAILED DESCRIPTION OF THE PREFERRED EMBODIMENTS

An explanation will be given as follows of embodiments of the invention in reference to the attached drawings. Here, "front", "rear", "left", "right" follow directions viewed from a driver. Further, the drawings are viewed in directions of notations.

Figure 1:
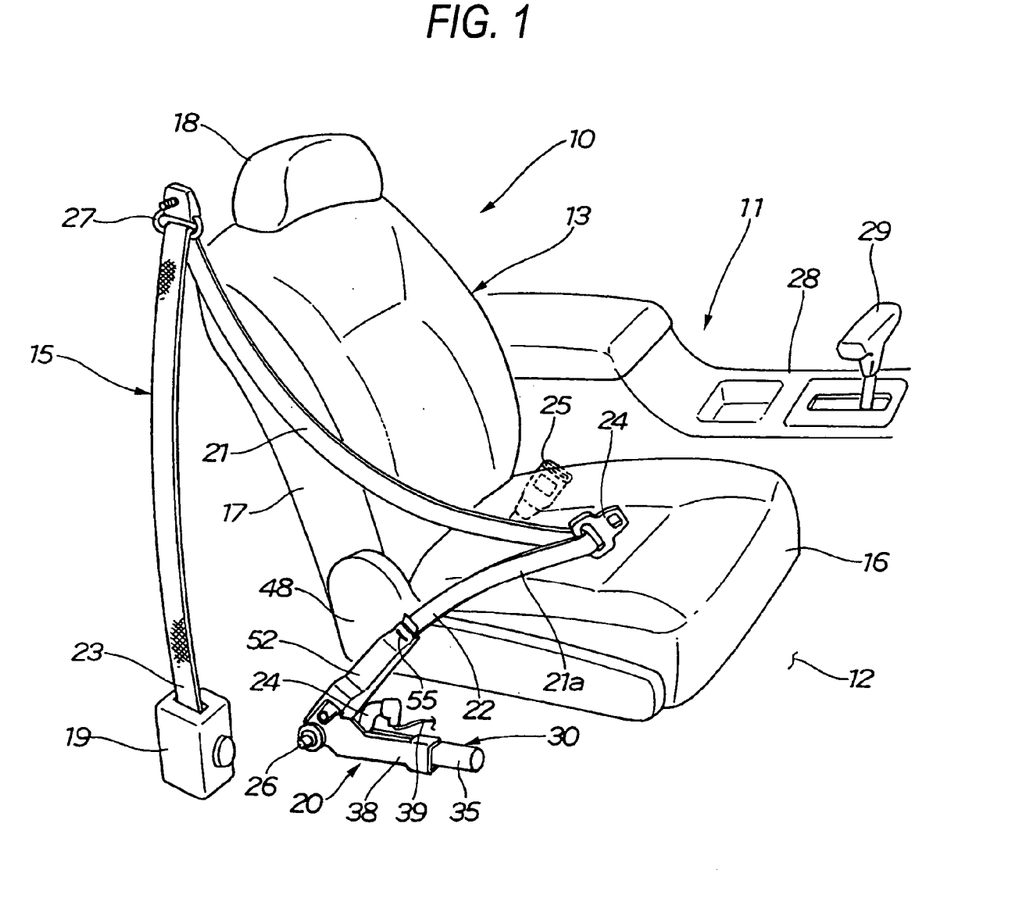
FIG. 1 is a perspective view showing a seat unit having a cover structure of a seat belt pretensioner according to the invention.

FIG. 1 is a perspective view showing a seat unit having a cover structure of a seat belt pretensioner according to the invention.

A seat unit 10 includes a seat 13 attached to a floor 12 of a vehicle 11, and a seat belt apparatus 15 for protecting a passenger seated on the seat 13.

The seat 13 includes a cushion 16 attached to the floor 12 of the vehicle 11, a seat back 17 reclinably attached to the seat cushion 16, and a head rest 18 attached to an upper portion of the seat back 17.

The seat belt apparatus 15 is provided with a winding apparatus 19 attached to a lower portion of a center pillar (not illustrated) on a right side of the seat 13, a seat belt pretensioner 20 attached to a vicinity of the winding apparatus 19, that is, the lower portion of the center pillar on the right side of the seat 13, a seat belt 21 one end 22 of which is attached to the seat belt pretensioner 20 and other end 23 of which is attached to the winding apparatus 19, a tongue 24 movably attached to the seat belt 21, and a buckle 25 for holding the tongue 24 at a left side portion of the seat cushion 16.

The seat belt pretensioner 20 is referred to as a so-to-speak outer wrap pretensioner configured to be attached to a side sil (not illustrated) at the lower portion of the center pillar via a bolt 26 and configured to positively pull the seat belt 21 (particularly, wrap belt 21a) by a combustion pressure of an explosive by detecting that a threshold is exceeded when a deceleration degree of the vehicle 11 exceeds the predetermined threshold.

Numeral 27 designates a through anchor provided at the center pillar, numeral 28 designates a console covering a floor tunnel (not illustrated), and numeral 29 designates a shift lever.

Figure 2:
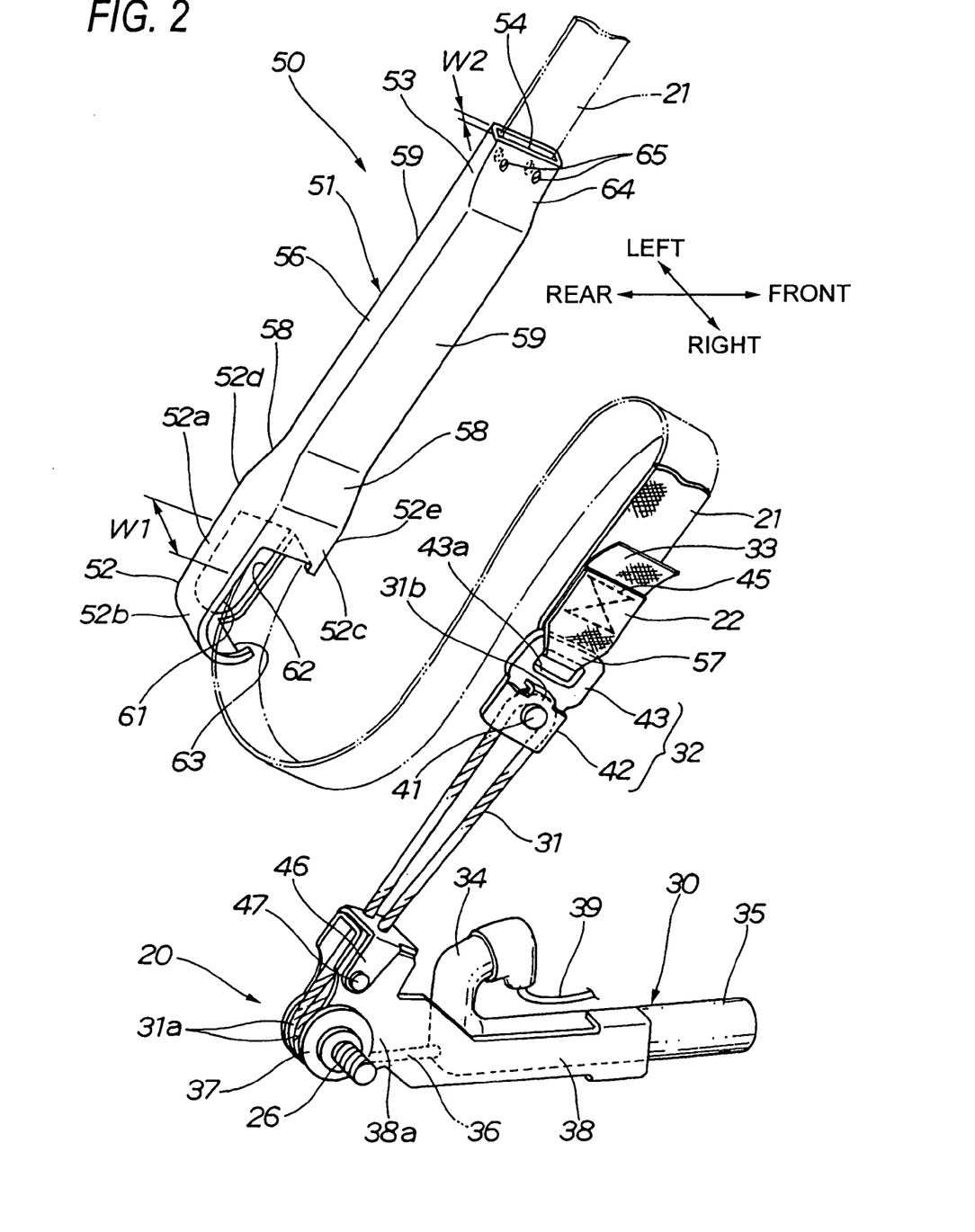
FIG. 2 is a disassembled perspective view showing the cover structure of the seat belt pretensioner according to the invention.

FIG. 2 is a disassembled perspective showing the cover structure of the seat belt pretensioner according to the invention, showing a state of removing the cover structure from a pretensioner main body.

According to the seat belt pretensioner 20, a pretensioner main body 30 for generating a tension force by reacting with the deceleration degree when the deceleration degree of the vehicle 11 (refer to FIG. 1) exceeds the threshold is arranged on the right side of the seat cushion 16 shown in FIG. 1, a moving member 32 is connected to the pretensioner main body 30 via a wire 31, the one end 22 of the seat belt 21 is connected to the moving member 32, and the seat belt 21 (particularly, the wrap belt 21a) is pulled via the moving member 32 by pulling the wire 31 by a tension force of the pretensioner main body 30.

The pretensioner main body 30 includes a gas generating portion 34 for generating a large amount of a gas when the deceleration degree of the vehicle 11 exceeds the threshold, a piston (not illustrated) moved by the gas flowing into a cylinder 35, a pulling wire 36 attached to the piston, a pulley 37 connected with a front end of the pulling wire 36, and the bolt 26 rotatably supporting the pulley 37 by a casing 38.

The gas generating portion 34 combusts an explosive (not illustrated) contained at inside thereof by conducting electricity to a harness 39 to move the piston by the combustion pressure of the explosive when the deceleration degree of the vehicle 11 is detected to exceed the threshold.

The wire 31 is connected to the moving member 32 by connecting both ends 31a, 31a thereof to the pulley 37 and hanging a central fold-to-bend portion 31b to a pin 41 of the moving member 32.

The moving member 32 includes a wire connecting portion 42 and a seat belt connecting portion 43. The wire connecting portion 42 is configured to contain the fold-to-bend portion 31b of the wire 31 and support the contained fold-to-bend portion 31b by the pin 41.

The seat belt connecting portion 43 is a rectangular plate integrally provided to the wire connecting portion 42 and formed with an attaching port 43a and is configured to insert the one end of the seat belt 21 into the attaching port 43a and connect the one end 22 of the seat belt 21 to the seat belt connecting portion 43 by folding back the inserted one end 22 and seaming the one end 22 by a seaming string 45.

In the following, the portion of folding back the one end 22 of the seat belt 21 is referred to as a fold back portion 57.

Further, a portion of overlapping the seat belt 21 and the one end 22 is attached with an acknowledgement label 33.

The casing 38 is provided along the pretensioner main body 30, a rear end thereof is formed with an attaching portion 38a for attaching the bolt 26 and a guide portion 46 for guiding the wire 31 is attached to an upper side of the attaching portion 38a via a screw 47.

Figure 3:
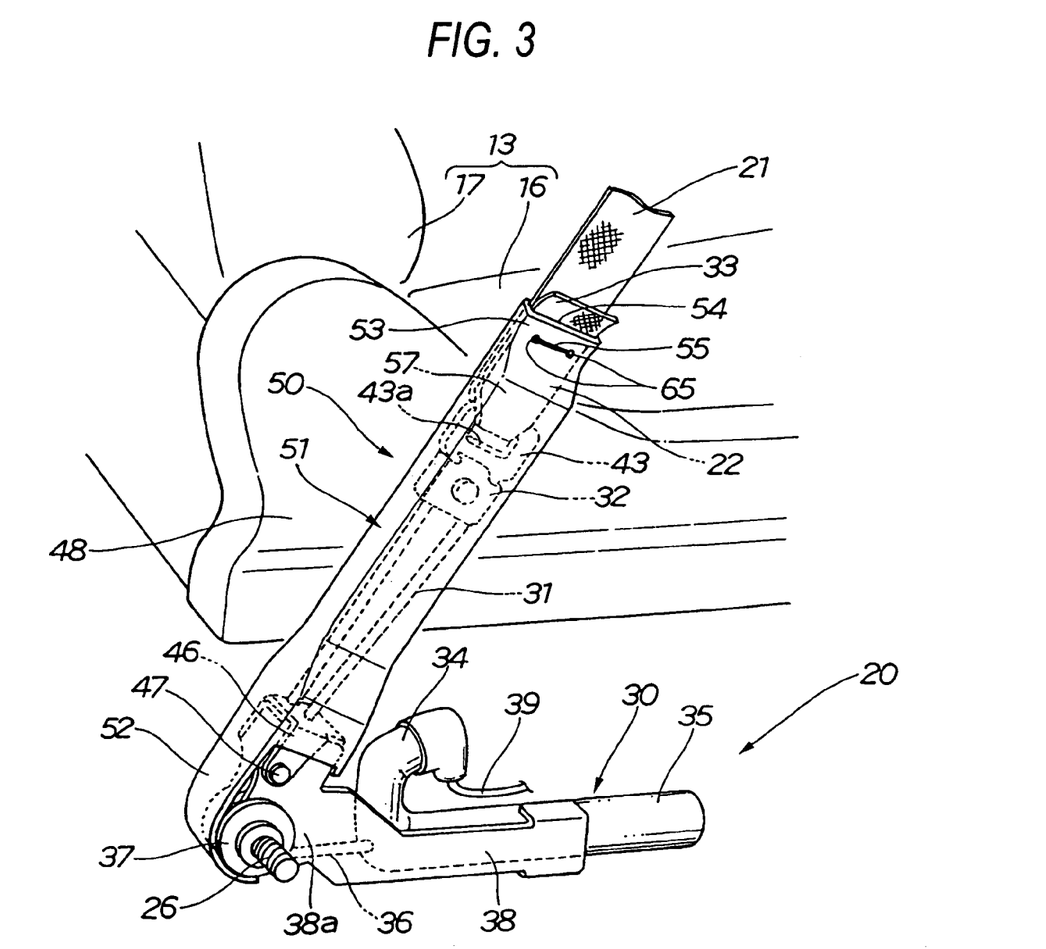
FIG. 3 is a perspective view showing the cover structure of the seat belt pretensioner according to the invention.

FIG. 3 is a perspective view showing a cover structure of the seat belt pretensioner according to the invention, showing a state of attaching a cover structure 50 to the pretensioner main body 30.

The cover structure 50 of the seat belt pretensioner is configured to surround the moving member 32 and the wire 31 by a containing cover 51, attach a lower portion 52 of the containing cover 51 to the pretensioner main body 30, provide a through port 54 for passing the seat belt 21 at an upper portion 53 of the containing cover 51, tacking the one end 22 of the seat belt 21 of the containing cover 51 by a seaming string (tacking string) 55 and break the tacking string 55 when the seat belt 21 is pulled by the tension force.

According to the containing cover 51, the fold back portion 57, that is, the portion of folding back the one end 22 of the seat belt 21 and connecting the seat belt 21 to the moving member 32 is contained at inside of the upper portion 53. Therefore, outlook performance can be promoted by concealing the fold back portion 57 (one end 22) by the containing cover 51.

Further, by surrounding the moving member 32 and the wire 31 by the containing cover 51 and attaching the lower portion 52 of the containing cover 51 to the pretensioner main body 30, the moving member 32, the wire 31 and the fold back portion 57 are supported by the containing cover 51 in a state of being slightly inclined forward.

Therefore, by supporting the fold back portion 57, that is, the one end 22 of the seat belt 21 at a predetermined position, promotion of handiness of the seat belt apparatus 15 (refer to FIG. 1) can be achieved.

In addition thereto, torsion of the containing cover 51 can be prevented by constituting the containing cover 51 by a cylindrical member having a section in the rectangular shape. Therefore, the moving member 32 can be maintained in a normal attitude, the one end 22 of the seat belt 21 can be maintained in the normal attitude, that is, an attitude by which torsion is not produced.

Thereby, the tongue 24 shown in FIG. 1 can be maintained in a normal attitude, the tongue 24 can easily be inserted into the buckle 25 and therefore, easiness of the seat belt apparatus 15 can preferably be maintained.

Referring back to FIG. 2, the containing cover 51 constituting the cover structure 50 is a soft cover formed by a resin of polyphenylene ether (PPE) as an example, rubber of elastomer as an example or the like.

Therefore, by making the cover structure 50 of the seat belt pretensioner softer than a reclining cover 48 (refer to FIG. 1, FIG. 3), the reclining cover 48 is prevented from being flawed when the cover structure 50 interferes with the reclining cover 48 (refer to FIG. 1, FIG. 3).

Further, the one end 22 of the seat belt 21 is tacked to the containing cover 51 by the seaming string 55. Thereby, even when the cover structure 50 of the seat belt pretensioner is made to be soft, the through port 54 can be prevented from being brought into an opening state, that is, a port opening state.

Further, the seaming string 55 is used for tacking the one end 22 of the seat belt 21 to the containing cover 51. The one end 22 of the seat belt 21 can simply be tacked to the containing cover 51 only by the seaming string 55.

In addition thereto, the one end 22 of the seat belt 21 can be tacked to the containing cover 51 by using the inexpensive seaming string 55.

The containing cover 51 is provided with the lower portion (hereinafter, referred to as "base containing portion") 52 for containing the attaching portion 38a and the guide portion 46 of the casing 38 and provided with an extended portion 56 extended upwardly while being forwardly inclined from the base containing portion 52.

The extended portion 56 is a portion of containing the wire 31, the moving member 32 and the fold back portion 57 of the seat belt 21.

According to the base containing portion 52, a side wall width W1 of a side wall 52a is formed to be large in accordance with widths of the attaching portion 38a of the casing 38 and the side portion 46, a bottom wall 52b thereof is formed in a bent shape in accordance with the pulley 37, a right wall 52c is formed with a right opening 61, a left wall 52d is formed with a left wall 62, a front wall 52e is formed with an opening 63 and the opening 63 is communicated to the right opening 61.

By communicating the opening 63 to the right opening 61, the attaching portion 38a of the casing 38 can be received at inside of the base containing portion 52.

The extended portion 56 is a cylindrical member having a section in a rectangular shape, left and right inclined walls 58, 58 are formed to incline such that a width of the left and right walls 58 is gradually narrowed from an upper end of the base containing portion 52 to an upper side, left and right straight walls 59, 59 are formed from upper ends of the left and right inclined walls 58, 58 to constitute a constant width, that is, a width of containing the wire 31 and the moving member 32, and by narrowing a through port width W2 of the through port 54 by forming a right wall 64 of the upper portion 53 in a bent shape, the through port 54 is formed to be able to pass only the seat belt 21 and the fold back portion 57.

A pair of inserting holes 65, 65 are formed at a vicinity of the through port 54 of the right wall 64 and the pair of inserting holes 65, 65 are formed at a vicinity of the through port 54 of the left straight wall 59. By utilizing the inserting holes 65 . . . , the seat belt 21 is tacked to the containing cover 51 by the seaming string 55 at a portion at a vicinity of the through port 54.

According to the cover structure 50 of the seat belt pretensioner, the moving member 32 and the wire 31 are surrounded by the containing cover 51 and the base containing portion (lower portion) 52 of the containing cover 51 is attached to the pretensioner main body 30.

Thereby, the containing cover 51 can be formed by a single member and a number of constituent parts of the containing cover 51 can be reduced.

Thereby, simplification of the containing cover 51 can be realized and a reduction in cost can be achieved.

Further, although an explanation has been given of an example of narrowing the through port width W2 of the through port 54 by forming only the right wall 64 of the upper portion 53 in the bent shape in the containing cover 51 shown in FIG. 3, the embodiment is not limited thereto but the through port 54 can also be set to the through port width W2 by forming the left and right walls of the upper portion in a bent shape.

Further, the through port 54 can also be set to the through port width W2 by setting totals of the left and right straight walls 59, 59 to the width W2 without forming the right wall 64 of the upper portion 53 in the bent shape.

Since the containing cover 51 is formed by a soft material, even when the totals of the left and right straight walls 59, 59 are set to the width W2, the wire 31 and the moving member 32 can be contained at inside of the containing cover 51.

In this way, by narrowing the width of the containing cover 51 by constituting the totals of the left and right straight walls 59, 59 by the width W2, the containing cover 51 can be arranged at a small space.

Figure 4:
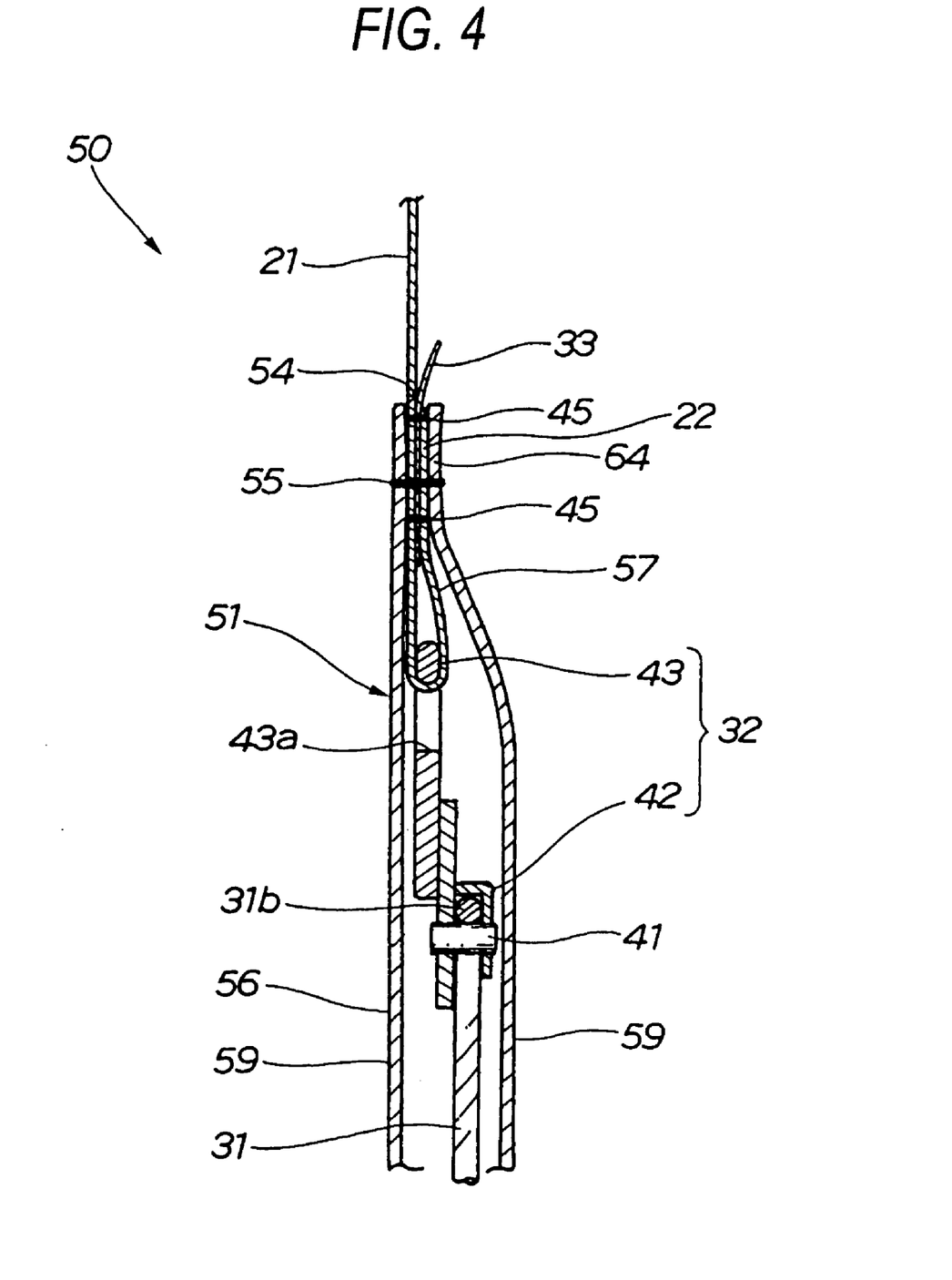
FIG. 4 is a sectional view showing an essential portion of the cover structure of the seat belt pretensioner according to the invention.

FIG. 4 is a sectional view showing an essential portion of the cover structure of the seat belt pretensioner according to the invention.

The one end 22 is connected to the seat belt connecting portion 43 by containing the fold back portion 31b of the wire 31 into the wire connecting portion 42 of the moving member 32, supporting the contained fold back portion 31b by the pin 41, integrally providing the seat belt connecting portion 43 to the wire connecting portion 42, inserting the one end 22 of the seat belt 21 into the attaching port 43a of the seat belt connecting portion 43, and folding back the inserted one end 22 and seaming the one end 22 by the seaming string 45.

The moving member 32 is movably contained in the extended portion 56, the seat belt 21 and the fold back portion 57 of the seat belt 21 are movably arranged at the through port 54 provided at the upper portion 53 of the extended portion 56, and the one end 22 (more in details, the fold back portion 57) of the seat belt 21 is tacked to the containing cover 51 by the seaming string 55.

Further, shapes of the base containing portion 52 and the extended portion 56 of the containing cover 51 shown in FIG. 2 through FIG. 4 are only an example and the embodiment is not limited to the illustrated shapes.

In sum, the containing cover 51 may be formed by a shape of capable of surrounding the moving member 32 and the wire 31 and attaching the lower portion (base containing portion) 52 to the pretensioner main body 30. Further, the containing cover 51 may be formed by a shape provided with the through port 54 for passing the seat belt 21 at the upper portion 53 of the containing cover 51 and capable of tacking the one end 22 of the seat belt 21 to the containing cover 51 at the portion at the vicinity of the through port 54.

Next, an explanation will be given of steps of integrating the cover structure of the seat belt pretensioner in reference to FIG. 2 and FIG. 5A through FIG. 6B.

As shown by FIG. 2, the one end 22 of the drawn-out seat belt 21 is inserted from the through hole 54 of the containing cover 51 and the inserted one end 22 is drawn out from the right opening 61 by passing inside of the containing cover 51.

The drawn-out one end 22 of the seat belt 21 is inserted into the attaching port 43*a* of the seat belt connecting portion 43, the inserted one end 43*a* is folded back and seamed by the seaming string 45 to thereby connect the one end 22 to the seat belt connecting portion 43.

The wire 31 is inserted into the wire connecting portion 42 of the moving member 32 and the fold back portion 31*b* of the wire 31 is hung on the pin 41. Thereby, the seat belt 21 is connected to the pretensioner main body 30 via the wire 31 and the moving member 32.

Figure 5A:
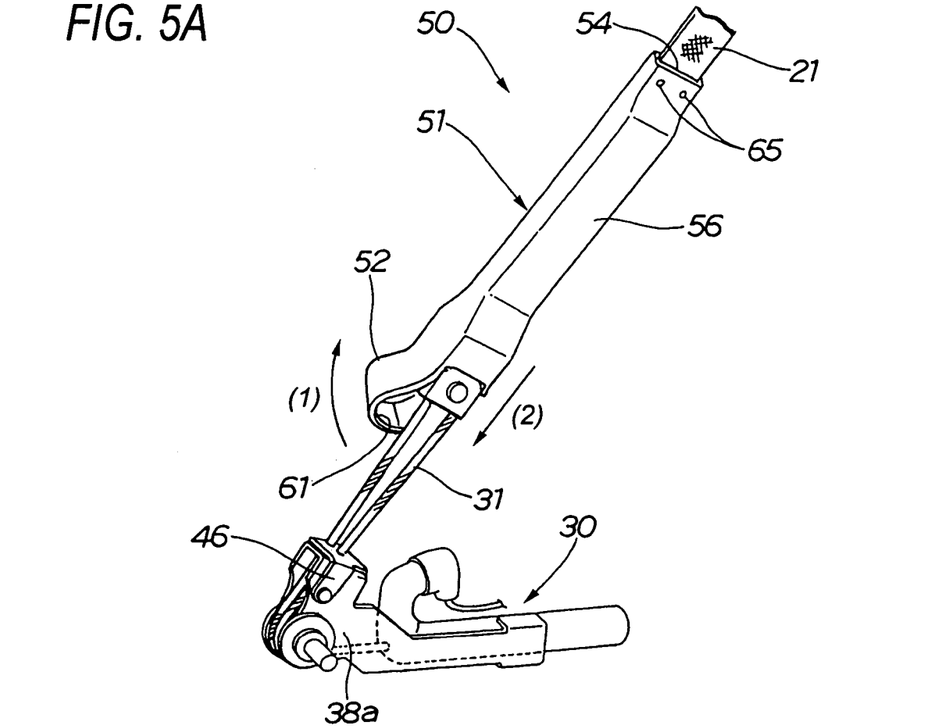
FIGS. 5A and 5B illustrate explanatory views of a first step showing a step of integrating the cover structure of the seat belt pretensioner according to the invention.
Figure 5B:
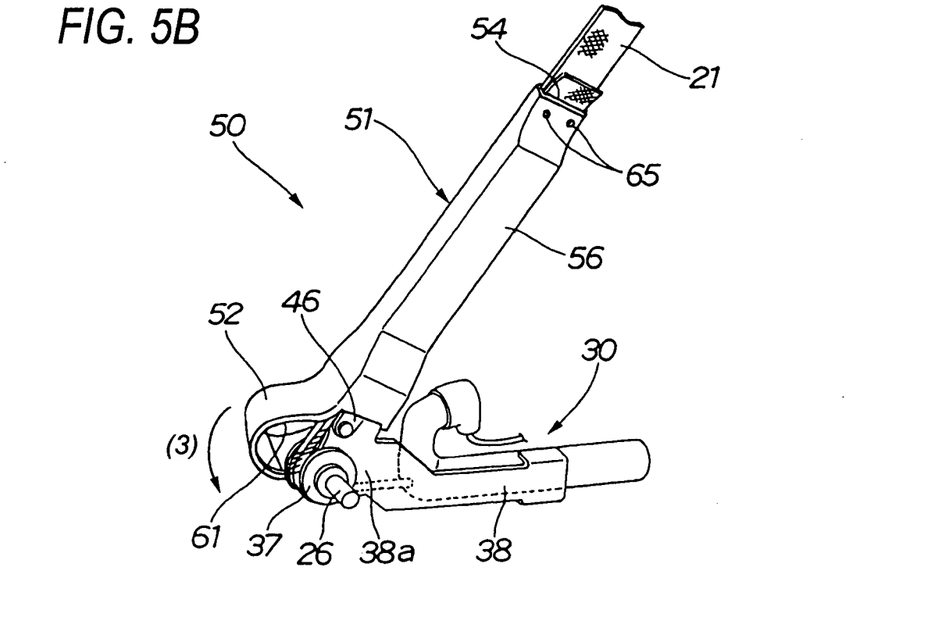

FIGS. 5A and 5B are explanatory views of a first step showing a step of integrating the cover structure of the seat belt pretensioner according to the invention.

In FIG. 5A, the containing cover 51 is bent as shown by an arrow mark (1) by elastically deforming the base containing portion 52.

As described above, the base containing portion 52 of the containing cover 51 can be bent as shown by the arrow mark (1) by elastically deforming the base containing portion 52 by forming the containing cover 51 by the soft cover formed by a resin of polyphenylene ether (PPE) as an example, rubber of elastomer as an example or the like.

In this way, in a state of bending the base containing portion 52 of the containing cover 51 as shown by the arrow mark (1) by elastically deforming the base containing portion 52, the containing cover 51 is moved to the pretensioner main body 30 as shown by an arrow mark (2) along the wire 31.

In FIG. 5B, after the base containing portion 52 of the containing cover 51 is made to reach the attaching portion 38*a* of the casing 38, the base containing portion 52 is moved in a direction of being recovered as shown by an arrow mark (3) by a recovery force by elastic deformation.

Figure 6A:
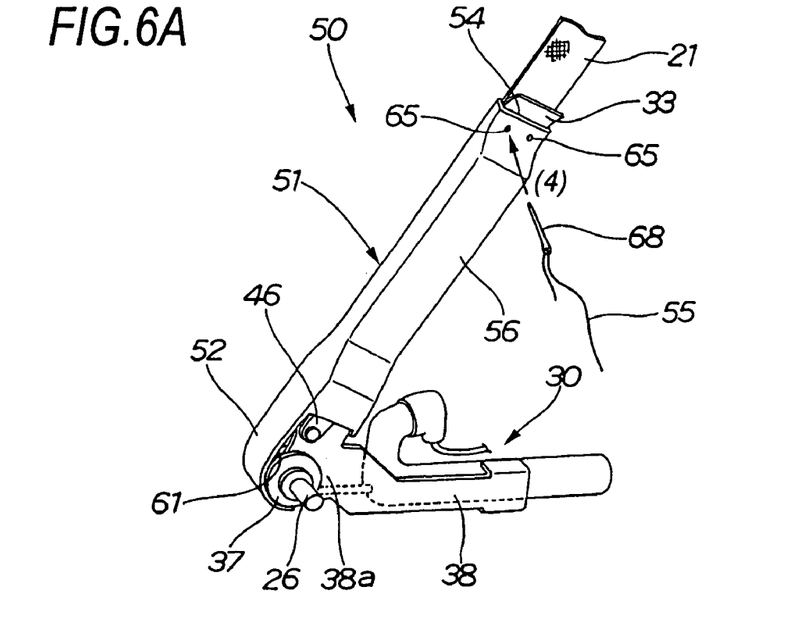
FIGS. 6A and 6B illustrate explanatory views of a second step showing a step of integrating the cover structure of the seat belt pretensioner according to the invention.
Figure 6B:
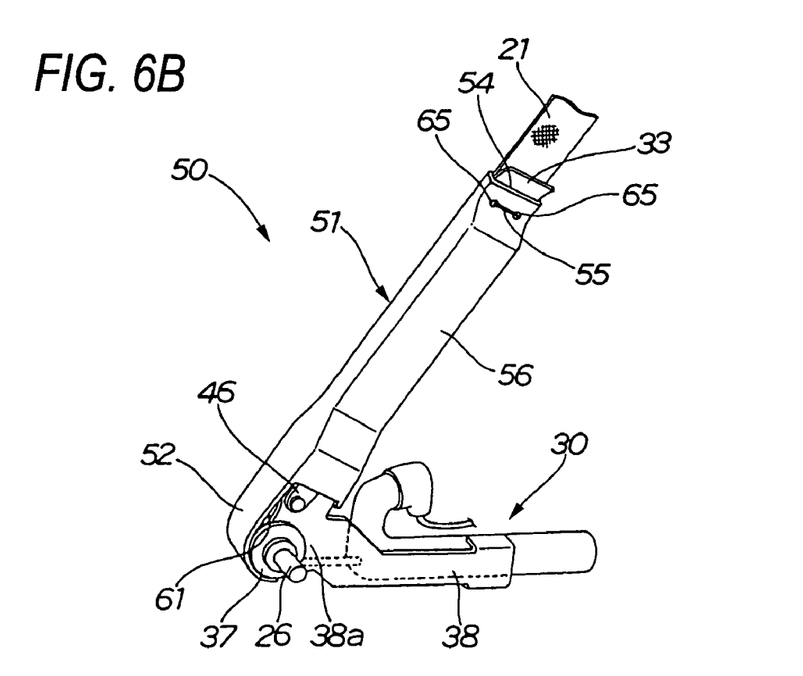

FIGS. 6A and 6B are explanatory views of a second step showing a step of integrating the cover structure of the seat belt pretensioner according to the invention.

In FIG. 6A, by recovering the base containing portion 52, the attaching portion 38*a* of the casing 38 and the guide portion 46 are contained from the right opening portion 61 to inside of the base containing portion 52 by recovering the base containing portion 52.

Next, needles 65 are pierced through the pair of inserting holes 65, 65 of the right wall 64 and the pair of inserting holes 65, 65 of the left straight wall 59 (refer to FIG. 2), as shown by an arrow mark (4).

In FIG. 6B, the one end 22 of the seat belt 21 is tacked to the containing cover 51 by the seaming string 55 at the portion at the vicinity of the through port 54.

Thereby, the steps of integrating the cover structure 50 of the seat belt pretensioner are finished.

Figure 10A:
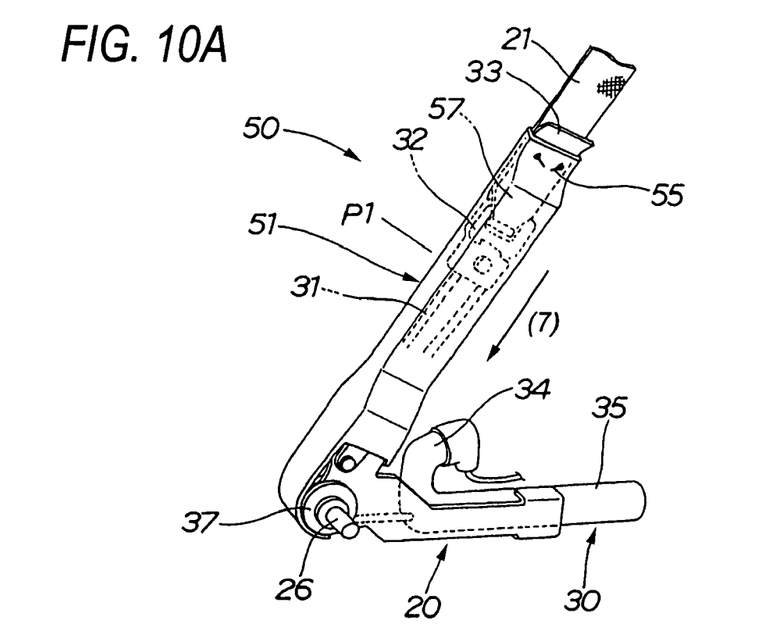
FIGS. 10A and 10B illustrate fourth operation of the cover structure of the seat belt pretensioner according to the invention.
Figure 10B:
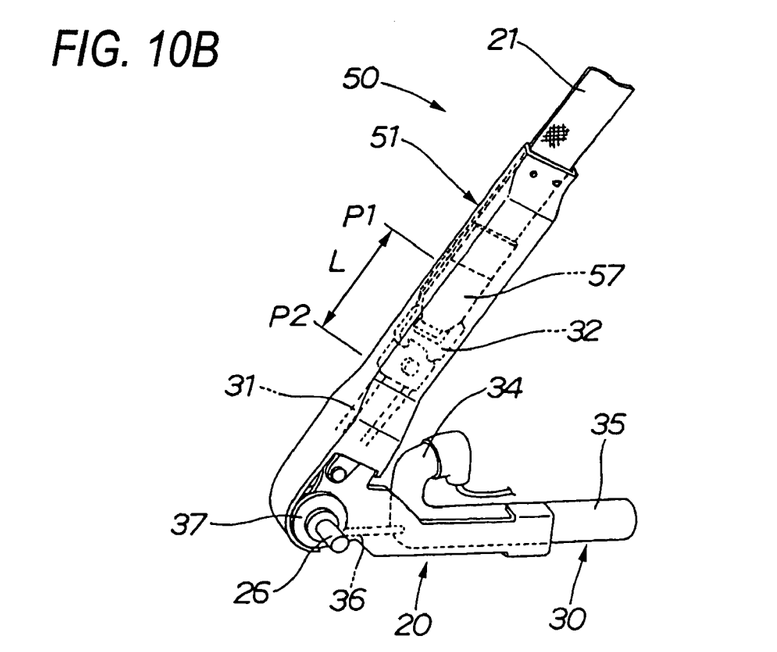

Next, an explanation will be given of operation of the cover structure of the seat belt pretensioner in reference to FIG. 7 through FIG. 10.

Figure 7:
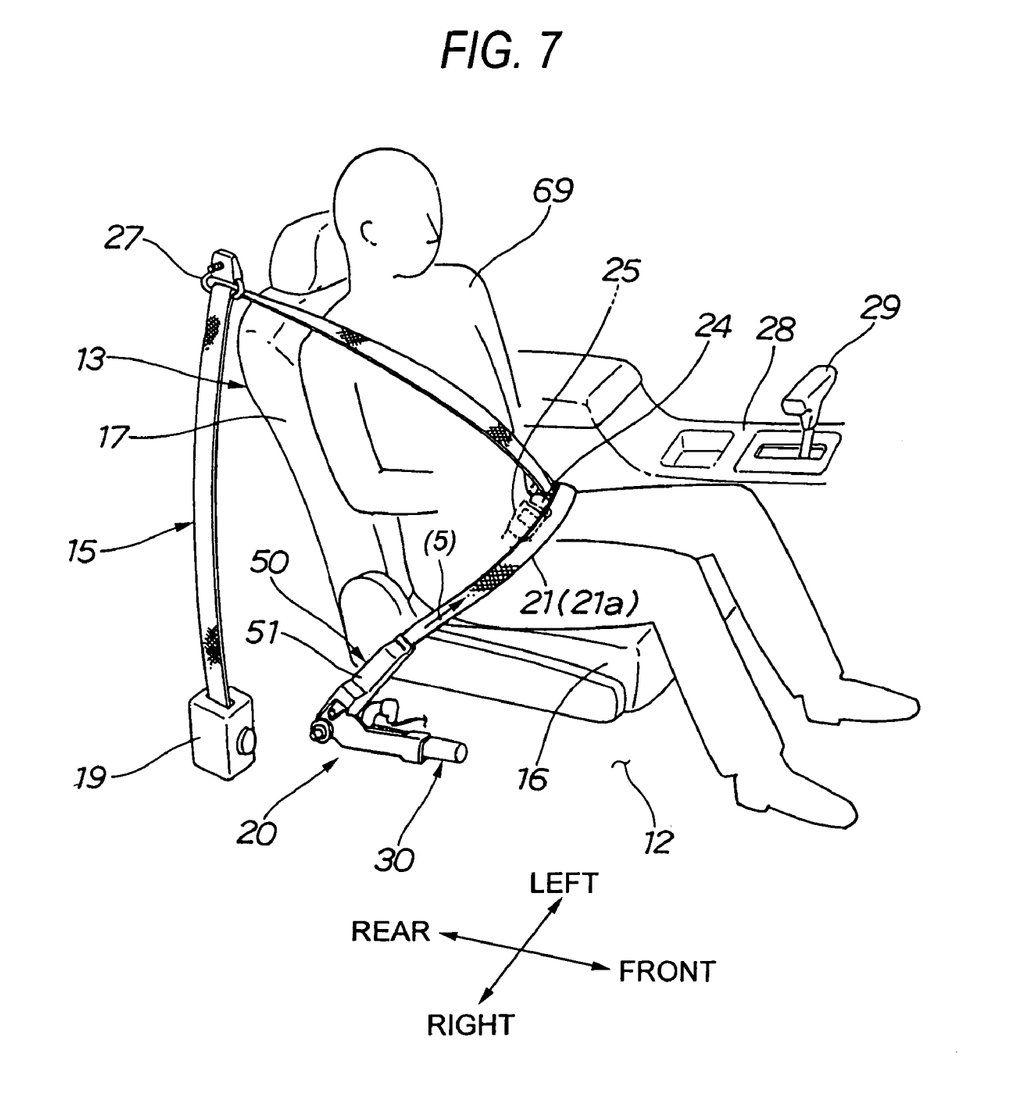
FIG. 7 is an explanatory view of first operation of the cover structure of the seat belt pretensioner according to the invention.

FIG. 7 is an explanatory view of first operation of the cover structure of the seat belt pretensioner according to the invention.

A passenger 69 is seated on the seat 13, grabs the tongue 25 of the seat belt apparatus 15 (refer also to FIG. 1), moves the tongue 24 to the left side of the passenger 69 and holds the tongue 24 to the buckle 25 (refer also to FIG. 1) arranged on the left side of the seat cushion 16.

In this way, when the passenger 69 uses the seat belt apparatus 15, the passenger 69 holds the tongue 24 to the buckle 25 by moving the tongue 24 to the left side of the body and therefore, the passenger 69 pulls the seat belt 61, particularly the wrap belt 21*a* in a direction of an arrow mark (5).

Figure 8A:
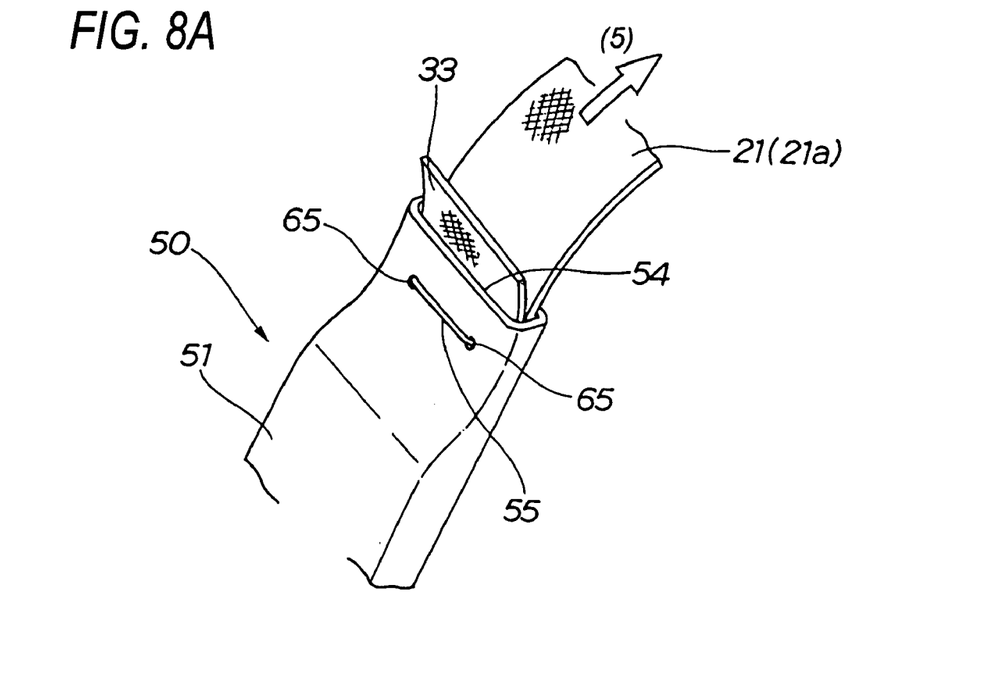
FIGS. 8A and 8B illustrate explanatory views of second operation of the cover structure of the seat belt pretensioner according to the invention.
Figure 8B:
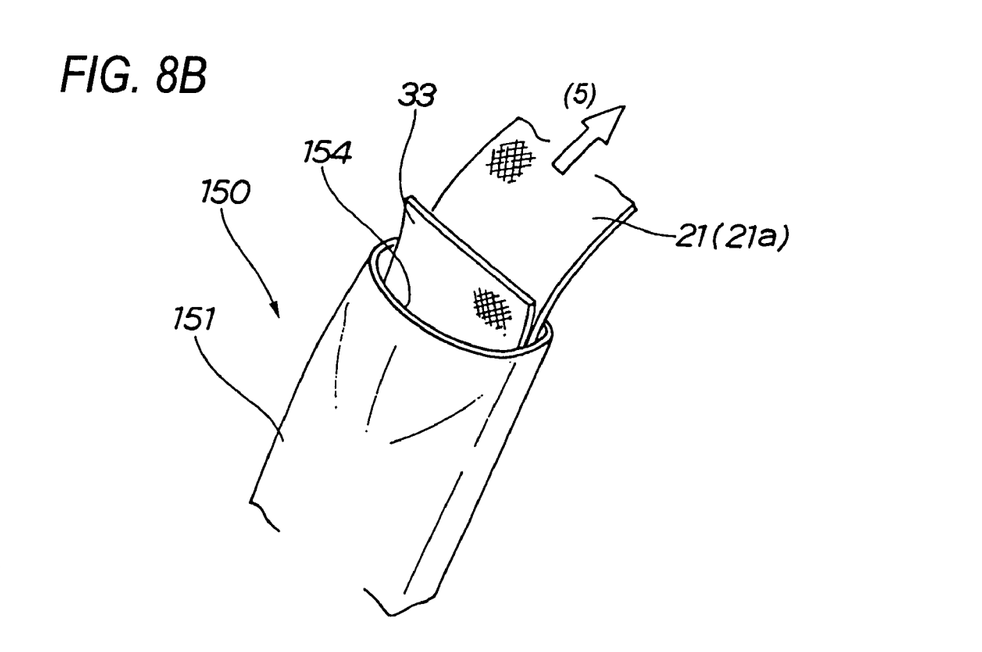

FIGS. 8A and 8B are explanatory views of second operation of the cover structure of the seat belt pretensioner according to the invention, FIG. 8A explains the cover structure 50 according to the embodiment as an example and FIG. 8B explains a comparative example.

Further, in the comparative example, members having constitutions the same as those of the example are attached with the same notations and the explanation thereof will be omitted.

In FIG. 8A, as shown by FIG. 7, by holding the tongue 24 of the seat belt apparatus 15 to the buckle 25, the seat belt 21, particularly the wrap belt 21*a* is pulled in the direction of the arrow mark (5). Thereby, a force for opening the through hole 54 of the containing cover 51 is exerted.

Here, the one end 22 of the seat belt 21 is tacked to the containing cover 51 by the seaming string 55 at the vicinity of the through hole 54 of the containing cover 51.

Therefore, by holding the tongue 24 of the seat belt apparatus 15 to the buckle 25 as an example, in a state of pulling the seat belt 21, particularly the wrap belt 21*a* in the direction of the arrow mark (5), the through hole 54 can be restrained such that the through hole 54 is not opened by the seaming string 55.

By preventing the through hole 54 from being opened in this way, for example, dust can be prevented from invading from the through hole 54 into the containing cover 51.

In FIG. 8B, by holding the tongue 24 of the seat belt 15 of the buckle 25 similar to the example, the seat belt 21, particularly the wrap belt 21*a* is pulled in the direction of the arrow mark (5). Thereby, a force of opening a through hole 154 of a containing cover 151 is exerted.

Here, the containing cover 151 does not tack the one end 22 to the containing cover 151 of the seat belt 21 by the seaming string 55 at a vicinity of the through hole 154.

Therefore, in the sate of pulling the seat belt 21 in the direction of the arrow mark (5) by holding the tongue 24 of the seat belt apparatus 15 to the buckle 25 (refer to FIG. 1) as an example, the through hole 154 cannot be restrained such that the through hole 154 is not opened by the seaming string 55.

Thereby, the through hole 154 is opened and, for example, dust invades inside of the containing cover 151 from the through port 154.

Figure 9A:
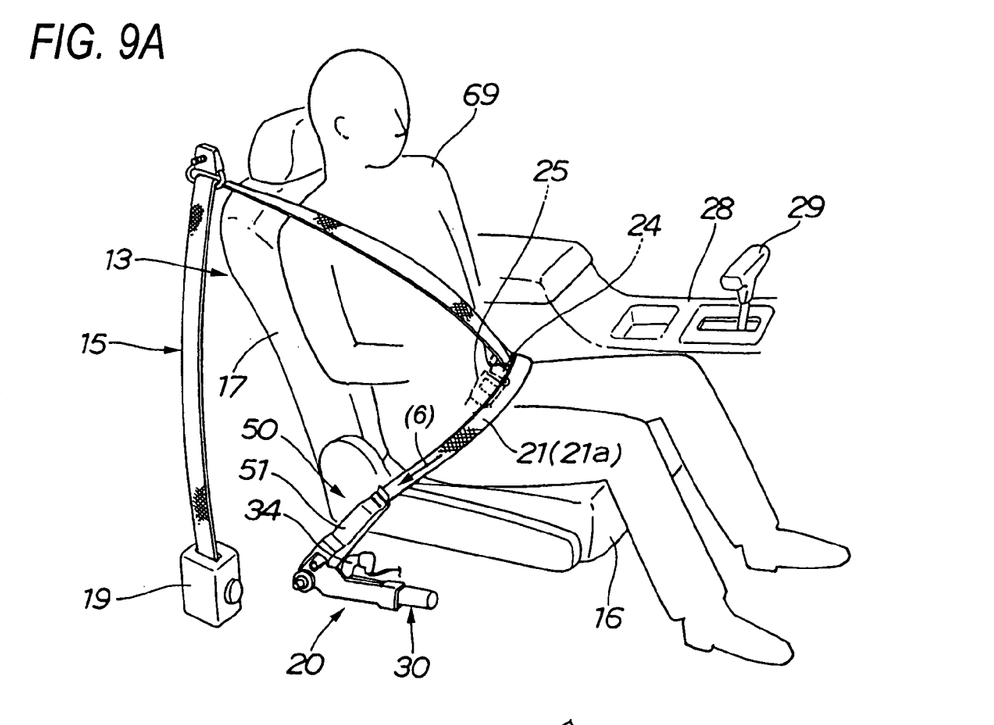
FIGS. 9A and 9B illustrate explanatory views of third operation of the cover structure of the seat belt pretensioner according to the invention.
Figure 9B:
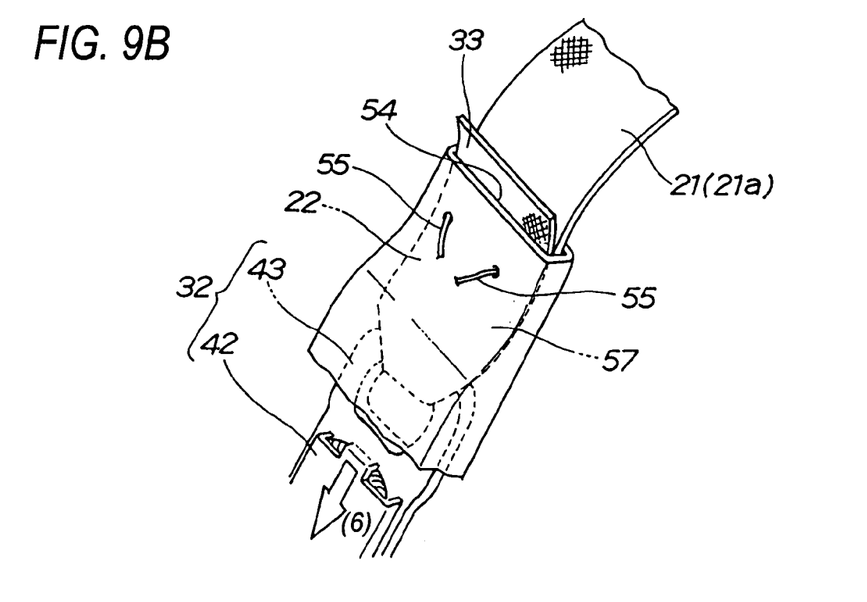

FIGS. 9A and 9B are explanatory views of third operation of the cover structure of the pretensioner according to the invention.

In FIG. 9A, in the state of holding the tongue 24 of the seat belt apparatus 15 to the buckle 25, when the deceleration degree of the vehicle 11 (refer to FIG. 1) exceeds the threshold, by generating the gas of the gas generating portion 34 of the pretensioner main body 30, the tension force is generated at the pretensioner main body 30.

By pulling the wire 31 shown in FIG. 2 by the generated tension force, a pulling force for pulling as shown by an arrow mark (6) is generated at the one end 22 (fold back portion 57) of the seat belt 21 by the moving member 32.

In FIG. 9B, by generating the pulling force as shown by the arrow mark (6) at the fold back portion 57 of the seat belt 21 via the moving member 32, the seaming string 55 used for tacking is broken by the generated spring force.

FIGS. 10A and 10B are explanatory views of fourth operation of the cover structure of the seat belt pretensioner according to the invention.

In FIG. 10A, after breaking the seaming string 55, the moving member 32 pulls the seat belt 21 as shown by an arrow mark (7) from a pulling start position P1.

In FIG. 10B, by moving the moving member 32 to a pulling finish position P2, the seat belt 21 is pulled by a predetermined amount L by the moving member 32. Thereby, the passenger 69 (refer to FIG. 9A) is constrained by the seat belt 21.

As has been explained above, according to the cover structure 50 of the seat belt pretensioner, the moving member 32 can be moved without crushing the containing cover 51 by covering the moving 32 and enabling the moving member 32 to move in the containing cover 51.

Therefore, when a length of the containing cover 51 is determined, a consideration may be given only to the moving amount L of the moving member 32 and therefore, the containing cover 51 can comparatively be shortened.

Thereby, the seat comfort can be maintained excellently by preventing the containing cover 51 from touching the passenger 59 in the state in which the passenger 69 is seated on the seat 13 by restraining the containing cover 51 from projecting to the upper side of the seat cushion 16.

Further, by shortening the total length of the containing cover 51, for example, in adjusting a state of reclining the seat back 17, the seat cover 51 does not constitute a hindrance against the reclining operation.

In contrast thereto, when the moving member is moved while crushing the containing cover by the moving member as in the related art, the length of the containing cover needs to determine in consideration of a length in crushing the containing cover in addition to an amount of moving the moving member. Therefore, the total length of the containing cover becomes comparatively long.

Thereby, the containing cover is projected to the upper side of the seat cushion, when the passenger is seated on the seat, the containing cover touches the passenger and the seat comfort cannot be maintained excellently.

Further, since the total length of the containing cover is prolonged, for example, in adjusting the reclining state of the seat back, the containing cover constitutes a hindrance against the reclining operation.

Further, although according to the above-described embodiment, an explanation has been given by taking an example of the seaming string 55 for tacking the one end 22 of the seat belt 21 to the containing cover 51, other means of an adhering agent or the like can also be used therefor.

Further, although according to the embodiment, an explanation has been given of an example of containing the one end 22 of the seat belt 21 or the total of the one end 22 of the seat belt 21 at inside of the upper portion 53 of the containing cover 51 and projecting the acknowledgement label 33 from the upper portion 53 of the containing cover 51, the acknowledgement label 33 can also be contained in the upper portion 53 of the containing cover 51.

In addition thereto, although according to the embodiment, an explanation has been given of the example of attaching the acknowledgement label 33 at the portion of overlapping the seat belt 21 and the one end 22, a position of attaching the acknowledgment label 33 is not limited to the example but can arbitrarily be determined.

According to the invention the wire is pulled by the tension force of the pretensioner main body and the moving member is pulled by the wire to thereby break the tacking of the seat belt and move the moving member in the containing cover to the pretensioner main body. By moving the moving member, the seat belt is pulled by the moving member and the passenger is constrained by the seat belt.

By moving the moving member in the containing cover, the moving member can be moved without crushing the containing cover.

Therefore, the total length of the containing cover can be determined in consideration only of the amount of moving the moving member without taking a consideration of the cover length in crushing the containing cover and the containing cover can be restrained to be short.

Whereby, the seat comfort can be maintained excellently by preventing the containing cover from touching the passenger in the state in which the passenger is seated on the seat by restraining the containing cover from being projected to the upper side of the seat cushion.

Further, by shortening the total length of the containing cover, for example, in operating the reclining operating lever of the seat back, the containing cover can be prevented from constituting a hindrance in operating the reclining operating lever.

In addition thereto, the seat belt is tacked to the containing cover at the portion of the through port of the containing cover. Therefore, for example, in restraining the passenger by using the seat belt, even when the seat belt connected to the moving member is deformed in the bent shape by following the body of the passenger, the through port can be prevented from being pushed to widen by the seat belt.

Whereby, dust or the like can be prevented from invading the inside of the containing cover by firmly closing the through port of the containing cover.

Further, by covering the moving member and the wire by the containing cover and attaching the lower portion of the containing cover to the pretensioner main body, the constitution of the containing cover can be formed by a single member and a number of constituent parts of the containing cover can be reduced.

Whereby, simplification of the containing cover can be realized and a reduction in cost can be achieved.

According to the invention, the seaming string is used for tacking the seat belt to the containing cover. The seat belt can simply be tacked to the containing cover only by the seaming string. In addition thereto, the seat belt can be tacked to the containing cover by using the inexpensive seaming string. Thereby, cost of the cover structure of the seat belt pretensioner can be restrained.

Meanwhile, when the wire is pulled by the tension force of the pretensioner main body, by pulling the moving member by the wire, the seaming string can be broken. Therefore, the seat belt is pulled by the moving member by moving the moving member in the containing cover to the pretensioner main body. Thereby, protection of the passenger can be achieved by constraining the passenger by the seat belt.

What is claimed is:

1. A seat belt pretensioner, comprising:
   a pretensioner main body which generates a tension force by reacting with a deceleration of a vehicle exceeding a constant value, the pretensioner main body disposed at a side of a seat cushion;
   a moving member connected to an end of a seat belt;
   a wire which connects the pretensioner main body with the moving member and transmits the tension force therethrough to the seat belt to pull the seat belt; and
   a containing cover which covers the moving member and the wire;
   wherein the containing cover includes a lower portion attached to the pretensioner main body and an upper portion having a through port for allowing the end of seat belt to pass therethrough.

2. The seat belt pretensioner according to claim 1,
   wherein the upper portion has a tacking portion in which the seat belt is tacked to the containing cover; and
   the tacking portion is broken by the tension force when the seat belt is pulled.

3. The seat belt pretensioner according to claim 2,
   wherein the tacking portion includes a seaming string which tacks the seat belt.

* * * * *